(12) United States Patent
Malhotra et al.

(10) Patent No.: US 12,128,568 B2
(45) Date of Patent: Oct. 29, 2024

(54) SYSTEM AND METHOD TO FACILITATE COMMUNICATION BETWEEN CONTROL SERVER AND ROBOTIC DEVICES

(71) Applicant: Grey Orange Incorporated, Roswell, GA (US)

(72) Inventors: Siddharth Malhotra, New Delhi (IN); Mohit Kumar, Meerut (IN); Jai Thakkar, Dhanbad (IN); Sumit Kumar Tiwary, Gorakhpur (IN)

(73) Assignee: Grey Orange Incorporated, Roswell, GA (US)

( * ) Notice: Subject to any disclaimer, the term of this patent is extended or adjusted under 35 U.S.C. 154(b) by 210 days.

(21) Appl. No.: 17/951,434

(22) Filed: Sep. 23, 2022

(65) Prior Publication Data
US 2023/0090526 A1  Mar. 23, 2023

(30) Foreign Application Priority Data
Sep. 23, 2021  (IN) .............................. 202111043195

(51) Int. Cl.
*B25J 9/00*  (2006.01)
*B25J 9/16*  (2006.01)

(52) U.S. Cl.
CPC .......... *B25J 9/1682* (2013.01); *B25J 9/1602* (2013.01)

(58) Field of Classification Search
CPC ........ B25J 9/1682; B25J 9/1602; B25J 9/161; G05B 2219/31369; G05B 19/4186
See application file for complete search history.

(56) References Cited

U.S. PATENT DOCUMENTS

| 8,127,035 B1* | 2/2012 | Hood ................... | G06Q 10/107 709/227 |
| 10,629,296 B2* | 4/2020 | Soon-Shiong ......... | G16H 10/65 |
| 2022/0036123 A1* | 2/2022 | Cummings ............ | G06N 20/00 |

* cited by examiner

*Primary Examiner* — Ian Jen
(74) *Attorney, Agent, or Firm* — ZIEGLER IP LAW GROUP

(57) ABSTRACT

A system and method for facilitating communication between a control server and robotic devices are provided. An integration engine of the system identifies protocol schemes and message schemes that are supported by the control server and robotic devices. When the protocol schemes and message schemes of the control server and the robotic devices are same, the integration engine facilitates transmission and reception of instructions between the control server and the robotic devices through identified communication interfaces. When the protocol schemes and message schemes of the control server and the robotic devices are different, the integration engine translates the protocol schemes and message schemes that are received from one of the control server and the robotic devices to facilitate communication between the control server and the robotic devices through identified communication interfaces.

20 Claims, 11 Drawing Sheets

SYSTEM AND METHOD TO FACILITATE COMMUNICATION BETWEEN CONTROL SERVER AND ROBOTIC DEVICES

CROSS-REFERENCE TO RELATED APPLICATIONS/INCORPORATION BY REFERENCE

This Patent Application makes reference to, claims priority to, and claims the benefit of Indian provisional application IN202111043195 filed Sep. 23, 2021, the contents of which are hereby incorporated herein by reference in its entirety.

FIELD

Various embodiments of the disclosure relate generally to management of storage facilities, and more specifically to facilitate communication between a control server and robotic devices of storage facilities.

BACKGROUND

Electronic commerce (e-commerce) has changed the way customers purchase items. As e-commerce continues to grow at a significant pace overtaking conventional brick and mortar retail practices, many businesses are facing notable challenges of maintaining relevance in an online marketplace and competing with prominent players in the space. Modern storage facilities handle a large number of inventory items on a daily basis. Examples of such inventory items may include groceries, apparels, electronics, or the like. Such storage facilities typically receive a very high volume of items that needs to be processed for various purposes such as stocking, replenishment, fulfillment, or the like. Handling each inventory item in the storage facility may involve a few defined processes that may be same or different for different types of items. Execution of such defined processes requires different robotic devices to be used, where each robotic device must communicate with a control server for performing the processes. The storage facility onboards robotic devices from various vendors to maximize the scalability of the storage facility. The control server supports a specific protocol scheme and a message scheme that may be different from the protocol schemes and the message schemes supported by the robotic devices. Further, the robotic devices in the storage facility may support protocol and message schemes that are different from each other. Thus, facilitating communication between the control server and the robotic devices is a challenging task.

In light of the foregoing, there exists a need for a reliable solution that enables communication between the control server and the robotic devices.

Limitations and disadvantages of conventional approaches will become apparent to one of skill in the art, through comparison of described systems with some aspects of the present disclosure, as outlined in the remainder of the present application and with reference to the drawings.

SUMMARY

In an embodiment of the present disclosure, a method to facilitate communication between a control server and a plurality of robotic apparatuses is disclosed. The method may include receiving, by an integration engine, from the control server, a first set of instructions that conform to a first protocol scheme and have a first message scheme. The method may further include identifying, by the integration engine, whether the first protocol scheme and the first message scheme of the first set of instructions are supported by at least one robotic apparatus of the plurality of robotic apparatuses. Further, the method may include transmitting, by the integration engine, the first set of instructions to the plurality of robotic apparatuses based on the identification that the first protocol scheme and the first message scheme of the first set of instructions are supported by at least one robotic apparatus of the plurality of robotic apparatuses. Additionally, the method may include translating, by the integration engine, the first set of instructions to a second set of instructions based on the identification that a second set of protocol schemes and a second set of message schemes that are supported by the plurality of robotic apparatuses are different from the first protocol scheme and the first message scheme, respectively. The second set of instructions conforms to the second set of protocol schemes and have the second set of message schemes. Further, at least one of a first robotic apparatus and a second robotic apparatus of the plurality of robotic apparatuses executes a first service and a second service of a plurality of services in a storage facility based on a first instruction and a second instruction of the second set of instructions, respectively. The method may additionally include transmitting, by the integration engine, the second set of instructions to the plurality of robotic apparatuses. At least one of the first instruction and the second instruction of the second set of instructions is transmitted to the first robotic apparatus and the second robotic apparatus of the plurality of robotic apparatuses, respectively.

In another embodiment of the present disclosure, a method to facilitate communication between a control server and a plurality of robotic apparatuses is disclosed. The method may include receiving, by an integration engine, from the plurality of robotic apparatuses, a first set of instructions that conform to a first set of protocol schemes and have a first set of message schemes. The method may further include identifying, by the integration engine, whether the first set of protocol schemes and the first set of message schemes of the first set of instructions are supported by the control server. Further, the method may include transmitting, by the integration engine, the first set of instructions to the control server based on the identification that the first set of protocol schemes and the first set of message schemes of the first set of instructions are supported by the control server. Additionally, the method may include translating, by the integration engine, the first set of instructions to a second set of instructions based on the identification that a second protocol scheme and a second message scheme that are supported by the control server are different from the first set of protocol schemes and the first set of message schemes, respectively. The second set of instructions conforms to the second protocol scheme and have the second message scheme. The method may further include transmitting, by the integration engine, the second set of instructions to the control server, wherein a plurality of services for the plurality of robotic apparatuses are executed by the control server, based on the second set of instructions.

In yet another embodiment of the present disclosure, an integration engine is disclosed. The integration engine may facilitate communication between a control server and a plurality of robotic apparatuses. The integration engine may include a translation engine that is configured to receive from the plurality of robotic apparatuses, a first set of instructions that conform to a first set of protocol schemes and have a first set of message schemes. The translation engine may be further configured to identify whether the first set of protocol schemes and the first set of message schemes of the first set of instructions are supported by the control server. Further, the translation engine may be configured to transmit the first set of instructions to the control server based on the identification that the first set of protocol schemes and the first set of message schemes of the first set of instructions are supported by the control server. Additionally, the translation engine may be configured to translate the first set of instructions to a second set of instructions based on the identification that a second protocol scheme and a second message scheme that are supported by the control server are different from the first set of protocol schemes and the first set of message schemes, respectively. The second set of instructions may conform to the second protocol scheme and have the second message scheme. Further, the translation engine may be configured to transmit the second set of instructions to the control server and receive from the control server, a third set of instructions that conform to the second protocol scheme and have the second message scheme, in response to the second set of instructions. The translation engine may be configured to identify whether the second protocol scheme and the second message scheme of the third set of instructions are supported by at least one robotic apparatus of the plurality of robotic apparatuses. Further, the translation engine may be configured to transmit the third set of instructions to the plurality of robotic apparatuses based on the identification that the second protocol scheme and the second message scheme of the third set of instructions are supported by at least one robotic apparatus of the plurality of robotic apparatuses. The translation engine may be further configured to translate the third set of instructions to a fourth set of instructions based on the identification that the first set of protocol schemes and the first set of message schemes that are supported by the plurality of robotic apparatuses are different from the second protocol scheme and the second message scheme, respectively. The fourth set of instructions conforms to the first set of protocol schemes and have the first set of message schemes. At least one of a first robotic apparatus and a second robotic apparatus of the plurality of robotic apparatuses executes a first service and a second service of a plurality of services in a storage facility based on a first instruction and a second instruction of the fourth set of instructions, respectively. Further, the translation engine may be configured to transmit the fourth set of instructions to the plurality of robotic apparatuses. At least one of the first instruction and the second instruction of the fourth set of instructions is transmitted to the first robotic apparatus and the second robotic apparatus of the plurality of robotic apparatuses, respectively.

In some embodiments, the method may further include identifying, by the integration engine, a communication interface of a plurality of communication interfaces. The plurality of communication interfaces facilitates the transmission of the second set of instructions to the plurality of robotic apparatuses. At least one of the first instruction and the second instruction of the second set of instructions is transmitted to the first robotic apparatus and the second robotic apparatus of the plurality of robotic apparatuses, respectively, via the identified communication interface.

In some embodiments, the method may further include storing, in a memory of the integration engine, translation data associated with the translation of the first set of instructions to the second set of instructions and status data of the plurality of robotic apparatuses. The status data indicates a connection status of each robotic apparatus of the plurality of robotic apparatuses with the integration engine.

In some embodiments, the method may further include storing, in a memory of the integration engine, mapping data. The mapping data may indicate a mapping between the plurality of robotic apparatuses and the second set of protocol schemes, and the plurality of robotic apparatuses and the second set of message schemes.

In some embodiments, each instruction of the first set of instructions includes a first plurality of fields, and the translation of the first message scheme of the first set of instructions to the second set of message schemes of the second set of instructions indicates that each field of the first plurality of fields is translated to generate a corresponding field of a second plurality of fields associated with the second set of instructions.

In some embodiments, the first set of instructions is translated to the second set of instructions by way of a translation logic.

In some embodiments, the method further includes identifying, by the integration engine, a communication interface of a plurality of communication interfaces. The second set of instructions is transmitted to the control server via the identified communication interface.

In some embodiments, the integration engine may further include a communication interface identifier that is configured to identify a communication interface of a plurality of communication interfaces. The plurality of communication interfaces facilitates the transmission of the fourth set of instructions to the plurality of robotic apparatuses. At least one of the first instruction and the second instruction of the fourth set of instructions is transmitted to the first robotic apparatus and the second robotic apparatus of the plurality of robotic apparatuses, via the identified communication interface.

In some embodiments, the integration engine may further include a memory that is configured to store a translation logic that translates the first set of instructions to the second set of instructions and the third set of instructions to the fourth set of instructions.

In some embodiments, the communication between the control server and the plurality of robotic apparatuses may be facilitated by the integration engine that acts as a plug-in-play interface at the storage facility.

Methods and systems for facilitating communication between a control server and a plurality of robotic apparatuses are provided substantially as shown in, and described in connection with, at least one of the figures, as set forth. An integration engine may be configured to identify protocol schemes and message schemes of instructions received from at least one of a control server and a plurality of robotic apparatuses. Based on the identification, the integration engine may be configured to transmit the instructions to at least one of the control server and the plurality of robotic apparatuses or translate the protocol schemes and the message schemes to facilitate communication between the control server and the plurality of robotic apparatuses.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the present disclosure provide a method and a system to facilitate communication between a control server and a plurality of robotic apparatuses. The method and system provide a technical solution to facilitate communication between the control server and the robotic apparatuses that are operating on different protocol schemes and utilize different message schemes.

Figure 1A:
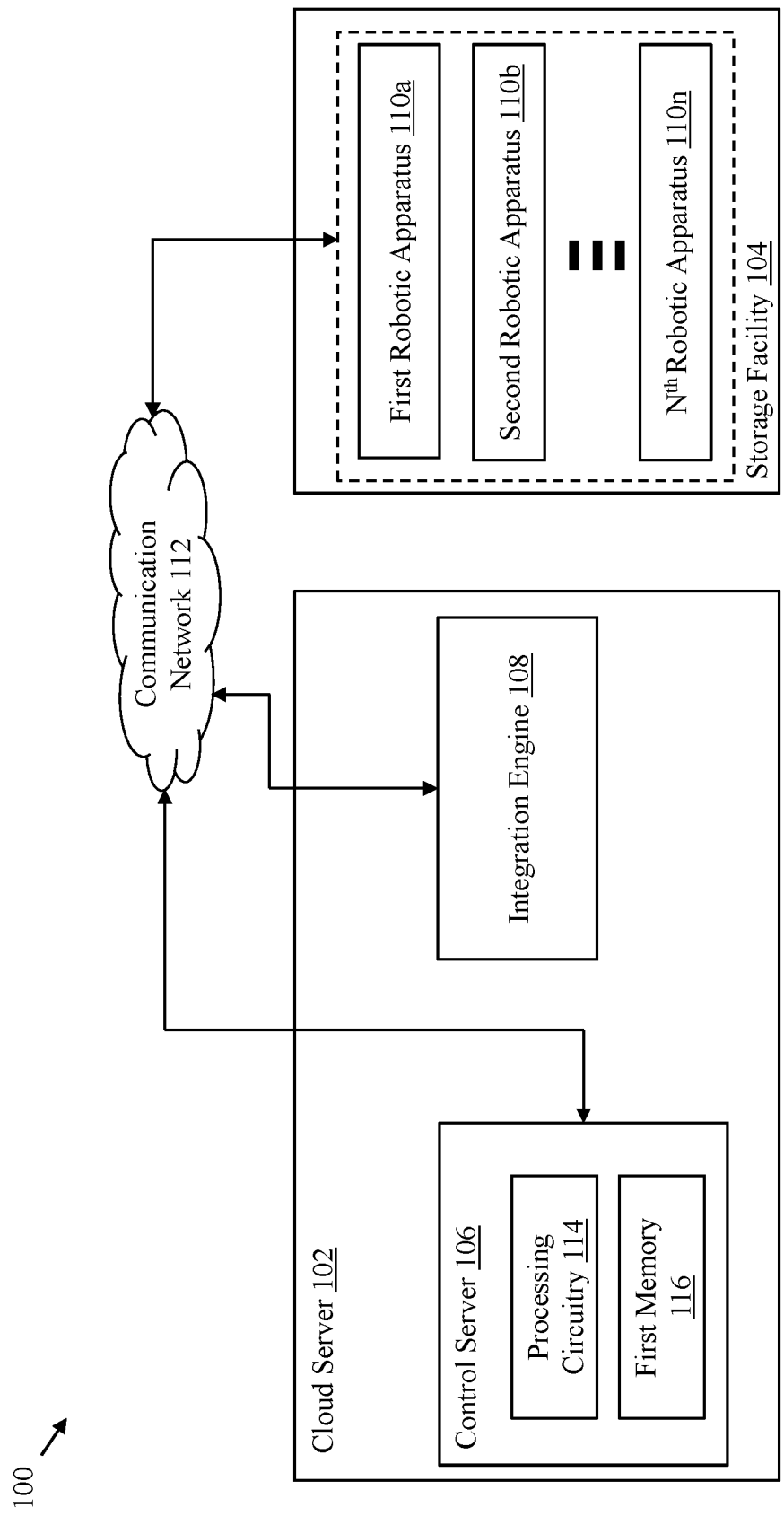
FIG. 1A is a block diagram that illustrates a system environment to facilitate communication between a control server and a plurality of robotic apparatuses, in accordance with an exemplary embodiment of the present disclosure.

FIG. 1A is a block diagram that illustrates a system environment 100. The system environment 100 is shown to include a cloud server 102 and a storage facility 104. The cloud server 102 may be configured to host the control server 106 and an integration engine 108. The storage facility 104 may include the plurality of robotic apparatuses 110a-110n. The plurality of robotic apparatuses 110a-110n include a first robotic apparatus 110a, a second robotic apparatus 110b, and so on till an $n^{th}$ robotic apparatus 110n. The system environment 100 facilitates communication between the control server 106 and the plurality of robotic apparatuses 110a-110n, in accordance with an exemplary embodiment of the disclosure. The system environment 100 is further shown to include a communication network 112. The control server 106 may communicate with the integration engine 108 by way of the communication network 112 or via separate communication networks established therebetween. Further, the plurality of robotic apparatuses 110a-110n may communicate with the integration engine 108 by way of the communication network 112 or via separate communication networks established therebetween.

The cloud server 102 may be a network device configured to host the control server 106 and the integration engine 108. The cloud server 102 may be a server configured to operate as a software as a service (SaaS) server, a web server, a database, a file repository, a file hosting server, or any other suitable web-enabled server.

The control server 106 may be a network of computers, a software framework, or a combination thereof, that may provide a generalized approach to create the server implementation. Examples of the control server 106 may include, but are not limited to, personal computers, laptops, minicomputers, mainframe computers, any non-transient and tangible machine that can execute a machine-readable code, cloud-based servers, distributed server networks, or a network of computer systems. The control server 106 may be realized through various web-based technologies such as, but not limited to, a Java web-framework, a .NET framework, a personal home page (PHP) framework, or any web-application framework. The control server 106 may be maintained by a storage facility management authority or a third-party entity that facilitates service enablement and robotic apparatuses allocation operations of the storage facility 104. The control server 106 may be part of an automated warehouse management system (WMS), which may be a standalone system. Alternatively, the control server 106 may be integrated with the automated WMS. In certain embodiments, the control server 106 may be integrated with supply chain systems and/or integrated enterprise resource planning (ERP) systems. The control server 106 may include processing circuitry 114 and a first memory 116.

The processing circuitry 114 may include suitable logic, instructions, circuitry, interfaces, and/or code for executing various operations, such as robotic apparatuses management operations, robotic apparatuses allocation operations, action planning operations, or the like. Examples of the processing circuitry 114 may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control (PLC) unit, and the like.

The processing circuitry 114 may be configured to receive various service requests from external systems or one or more systems within the storage facility 104. Based on a received request, the processing circuitry 114 may be configured to identify various services (or operations) that need to be performed to fulfill the received service request. Examples of such services may include transportation of a payload from one location to another, order consolidation, pick/put actions, item sortation, or the like. Upon identifying the services, the processing circuitry 114 may be configured to select, from the plurality of robotic apparatuses 110a-110n, one or more robotic apparatuses that are capable of executing the identified services. Once the robotic apparatuses are selected, the processing circuitry 114 may be configured to determine configuration parameters for the selected robotic apparatuses to control the selected robotic apparatuses of the plurality of robotic apparatuses 110a-110n for executing the identified services. In an example, the first robotic apparatus 110a of the plurality of robotic apparatuses 110a-110n may be capable of executing at least one of a lifting action, a rotation action, and a transportation action. In an example, the lifting action refers to lifting of an inventory item from a location A by the first robotic apparatus 110a in the storage facility 104. The rotation action refers to rotation of the first robotic apparatus 110a at 30 degrees. The transportation action refers to transportation of the inventory item from location A to location B. In such a scenario, the configuration parameters for the first robotic apparatus 110a may include an identifier of a payload that is to be lifted, a predetermined height for the lifting action, a degree of rotation for the payload, and path information for transporting the payload. The services that are to be executed by the plurality of robotic apparatuses 110a-110n may be referred to as "the plurality of services". Similarly, the second robotic apparatus 110b may not be capable of performing the aforementioned functions but capable of executing a pick/put operation. In such a scenario, the configuration parameters of the second robotic apparatus 110b may include parameters to enable the pick/put operation and may not include any path information.

The processing circuitry 114 may be further configured to generate instructions for the selected robotic apparatuses of the plurality of robotic apparatuses 110a-110n to cause the selected robotic apparatuses to execute the identified services. The instructions generated by the processing circuitry 114 conform to a first protocol scheme and have a first message scheme. Further, the processing circuitry 114 is configured to receive service requests or any other information only with the first message scheme on the first protocol scheme.

The first memory 116 may be configured to store various logic, instructions, interfaces, and/or code executable by the processing circuitry 114 for implementing various services at the storage facility 104. The first memory 116 may be further configured to store therein, resource data of the plurality of robotic apparatuses 110a-110n and historical data of the plurality of robotic apparatuses 110a-110n in the storage facility 104. The resource data may include configuration parameters of each robotic apparatus of the plurality of robotic apparatuses 110a-110n. The historical data may include information about the services performed by each robotic apparatus of the plurality of robotic apparatuses 110a-110n. Examples of the first memory 116 may include but are not limited to, a Read-Only Memory (ROM), a Random Access Memory (RAM), a flash memory, a removable storage drive, a hard disk drive (HDD), a solid-state memory, a magnetic storage drive, a Programmable Read Only Memory (PROM), an Erasable PROM (EPROM), and/or an Electrically EPROM (EEPROM). In some embodiments, a set of centralized or distributed network of peripheral memory devices may be interfaced with the control server 106 as an example, on the cloud server 102.

The storage facility 104 may be a warehouse facility where inventory items or packages of inventory items are stored for order fulfillment and/or selling. Examples of the storage facility 104 may include, but are not limited to, a forward warehouse, a backward warehouse, a fulfillment center, or a retail store (e.g., a supermarket, an apparel store, a departmental store, a grocery store, or the like). Examples of the inventory items may include, but are not limited to, groceries, apparel, electronic goods, mechanical goods, or the like. The range of inventory items may further vary in size, shape, weight, control conditions, dimensions, or the like.

Each robotic apparatus of the plurality of robotic apparatuses 110a-110n may include suitable logic, instructions, circuitry, interfaces, and/or code, executable by the circuitry, that may be configured to execute various actions associated with the storage facility 104. The plurality of robotic apparatuses 110a-110n may be utilized to implement various services and operations in the storage facility 104. Examples of a robotic apparatus of the plurality of robotic apparatuses 110a-110n may include, but are not limited to, autonomous mobile robots (AMRs), autonomous guided vehicles (AGVs), robotic manipulators with different types of end effectors, robotic apparatus with conveying mechanism, or the like.

In an embodiment, each robotic apparatus of the plurality of robotic apparatuses 110a-110n may be configured to receive an instruction that conforms to a specific protocol scheme and have a specific message scheme that are different than the first protocol scheme and the first message scheme, respectively. In another embodiment, the protocol scheme and the message scheme supported by the plurality of robotic apparatuses 110a-110n may be same as the first protocol scheme and the first message scheme, respectively. In an exemplary scenario, the first robotic apparatus 110a supports only a second message scheme and a second protocol scheme, and the second robotic apparatus 110b supports only a third message scheme and a third protocol scheme. Further, the second protocol scheme is different from the third protocol scheme and the second message scheme is different from the third message scheme. The protocol schemes supported by the plurality of robotic apparatuses 110a-110n are collectively referred to as a second set of protocol schemes. Similarly, the message schemes supported by the plurality of robotic apparatuses 110a-110n are collectively referred to as a second set of message schemes. In an embodiment, there may be an overlap between the first protocol scheme and the second set of protocol schemes, and the first message scheme and the second set of message schemes. In another embodiment, the first protocol scheme and the second set of protocol schemes are different from each other, and the first message scheme and the second set of message schemes are different from each other.

Examples of the at least one of the first protocol scheme and the second set of protocol schemes include, but are not limited to, Hypertext Transfer Protocol (HTTP), Simple Mail Transfer Protocol (SMTP), File Transfer Protocol (FTP), Transmission Control Protocol (TCP), User Datagram Protocol (UDP), or the like. At least one of the first message scheme and the second set of message schemes refers to one or combination of, a programming language in which the instruction is written, number of fields in the instruction, a type of the instruction, or the like. Examples of the programming language may include, but are not limited to JavaScript Object Notation (JSON), extensible markup language (XML), Python, Ruby, or the like. The type of the instruction may be a microservice type, a macro service type, or the like. In an example, the number of fields in the instruction may be 10, 12, or the like. Examples of the instructions in the microservice type may include, but are not limited to, "Take left," "Take right," "Move forward," or the like. Examples of the instructions in the macro service instruction type may include, but are not limited to, "Transport item 1 from location A to Location B", "Pick an item from location C", or the like. In an example, the first protocol scheme is HTTP and the first message scheme is JSON. Further, the second protocol scheme is TCP, the third protocol scheme is UDP, the second message scheme is XML, and the third message scheme is Python.

The integration engine 108 may be realized through various web-based technologies such as, but not limited to, a Java web-framework, a .NET framework, a personal home page (PHP) framework, or any web-application framework. Examples of the integration engine 108 may include, but are not limited to, personal computers, laptops, mini-computers, mainframe computers, any non-transient and tangible machine that can execute a machine-readable code, cloud-based servers, distributed server networks, or a network of computer systems. The integration engine 108 may be configured to facilitate communication between the control server 106 and the plurality of robotic apparatuses 110a-110n. The integration engine 108 may be maintained by a storage facility management authority or a third-party entity that facilitates service enablement and robotic apparatuses allocation operations of the storage facility 104.

In some embodiments, the integration engine 108 may translate the instructions from at least one of the first protocol scheme to the second set of protocol schemes, the second set of protocol schemes to the first protocol scheme, the first message scheme to the second set of message schemes, and the second set of message schemes to the first message scheme.

In an embodiment, the control server 106 generates a first set of instructions that conforms to the first protocol scheme and has the first message scheme, for the plurality of robotic apparatuses 110a-110n. Further, the first set of instructions is received by the integration engine 108 via a first communication interface of a plurality of communication interfaces. The integration engine 108 identifies the first communication interface via which the first set of instructions is received. Further, the integration engine 108 identifies the protocol scheme and the message scheme of the first set of instructions. The integration engine further checks whether the first protocol scheme and the first message scheme are supported by the plurality of robotic apparatuses 110a-110n. The integration engine 108 transmits the first set of instructions to the plurality of robotic apparatuses 110a-110n when the first protocol scheme and the first message scheme are supported by the plurality of robotic apparatuses 110a-110n. The integration engine 108 identifies a second set of communication interfaces of the plurality of communication interfaces to transmit the first set of instructions to the plurality of robotic apparatuses 110a-110n. In an example, the first set of instructions includes a first instruction and a second instruction that are directed to the first robotic apparatus 110a and the second robotic apparatus 110b, respectively. The protocol scheme of the first instruction and the second instruction of the first set of instructions conform to HTTP. The message scheme of the first instruction and the second instruction of the first set of instructions is JSON. When the first robotic apparatus 110a and the second robotic apparatus 110b support HTTP and JSON schemes, the integration engine 108 transmits the first instruction and the second instruction of the first set of instructions to the first robotic apparatus 110a and the second robotic apparatus 110b, respectively. The first robotic apparatus 110a and the second robotic apparatus 110b may execute a first service and a second service of the plurality of services, respectively in the storage facility 104. In an example, the first service may refer to the lifting action and the second service may refer to the transportation action.

When the second set of protocol schemes and the second set of message schemes that are supported by the plurality of robotic apparatuses 110a-110n are different from the first protocol scheme and the first message scheme, the integration engine 108 translates the first set of instructions to a second set of instructions. The second set of instructions conforms to the second set of protocol schemes and have the second set of message schemes. Further, the integration engine 108 identifies the second set of communication interfaces of the plurality of communication interfaces to transmit the second set of instructions to the plurality of robotic apparatuses 110a-110n. In an example, the first set of instructions include the first instruction and the second instruction that are directed to the first robotic apparatus 110a and the second robotic apparatus 110b, respectively. The protocol scheme of the first instruction and the second instruction of the first set of instructions conform to HTTP. The message scheme of the first instruction and the second instruction of the first set of instructions is JSON. Further, the first robotic apparatus 110a supports TCP scheme and XML scheme, and the second robotic apparatus 110b supports UDP scheme and Python Scheme. As a result, the integration engine 108 translates the first and second instructions of the first set of instructions to a third instruction and a fourth instruction of the second set of instructions, respectively. The third instruction of the second set of instructions conforms to TCP scheme and has XML scheme. Similarly, the fourth instruction of the second set of instructions conforms to UDP scheme and has Python scheme Further, the integration engine 108 transmits the third instruction and the fourth instruction of the second set of instructions to the first robotic apparatus 110a and the second robotic apparatus 110b, respectively through the identified second set of communication interfaces. The first robotic apparatus 110a and the second robotic apparatus 110b may execute the first service and the second service of the plurality of services in the storage facility 104. In an example, the first service may refer to the lifting action and the second service may refer to the transportation action.

In another embodiment, the plurality of robotic apparatuses 110a-110n generates a third set of instructions that conforms to the second set of protocol schemes and has the second set of message schemes, for the control server 106. Further, the third set of instructions is received by the integration engine 108 via the second set of communication interfaces of the plurality of communication interfaces. The integration engine 108 identifies the second set of communication interfaces via which the third set of instructions is received. Further, the integration engine 108 identifies the protocol schemes and the message schemes of the third set of instructions. When the second set of protocol schemes and the second set of message schemes are supported by the control server 106, the integration engine 108 transmits the third set of instructions to the control server 106. In an example, the third set of instructions includes a fifth instruction and a sixth instruction. The protocol scheme of the fifth instruction conforms to HTTP and the message scheme of the fifth instruction is JSON. The protocol scheme of the sixth instruction conforms to UDP and the message scheme of the sixth instruction is Python. When the control server 106 supports HTTP and JSON schemes, the integration engine 108 transmits the fifth instruction of the third set of instructions to the control server 106. The fifth instruction of the third set of instructions may indicate a connection status of the first robotic apparatus 110*a* with the integration engine 108. When the control server 106 supports UDP and Python schemes, the integration engine 108 transmits the sixth instruction of the third set of instructions to the control server 106. The sixth instruction of the third set of instructions may indicate a connection status of the second robotic apparatus 110*b* with the integration engine 108.

When the second set of protocol schemes and the second set of message schemes are different from the first protocol scheme and the first message scheme, the integration engine 108 translates the third set of instructions to a fourth set of instructions. The fourth set of instructions conforms to the first protocol scheme and the first message scheme. Further, the integration engine 108 identifies the first communication interface of the plurality of communication interfaces to transmit the fourth set of instructions to the control server 106. In an example, the third set of instructions includes the fifth instruction and the sixth instruction that are directed to the control server 106. The protocol scheme of the fifth instruction conforms to TCP and the message scheme of the fifth instruction is XML. The protocol scheme of the sixth instruction conforms to UDP and the message scheme of the sixth instruction is Python. The control server 106 supports HTTP scheme and JSON scheme. As a result, the integration engine 108 translates the fifth and sixth instructions of the third set of instructions to a seventh instruction and an eighth instruction of the fourth set of instructions, respectively. The seventh and eighth instructions of the fourth set of instructions conforms to HTTP scheme and has JSON scheme. Further, the integration engine 108 transmits the seventh instruction and the eighth instruction of the fourth set of instructions to the control server 106. The seventh instruction of the fourth set of instructions may indicate the connection status of the first robotic apparatus 110*a* with the integration engine 108 and the eighth instruction of the fourth set of instructions may indicate the connection status of the second robotic apparatus 110*b* with the integration engine.

The communication network 112 may include suitable logic, circuitry, and interfaces that may be configured to provide a plurality of network ports and a plurality of communication channels for transmission and reception of data related to operations of various entities (such as the control server 106, the integration engine 108, and the plurality of robotic apparatuses 110*a*-110*n*) of the system environment 100. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 112 may be associated with an application layer for the implementation of communication protocols based on one or more communication requests from the control server 106, the integration engine 108, and the plurality of robotic apparatuses 110*a*-110*n*. The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In one embodiment, the communication data may be transmitted or received via at least one communication channel of a plurality of communication channels in the communication network 112. The communication channels may include, but are not limited to, a wireless channel, a wired channel, or a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Metropolitan Area Network (MAN), a satellite network, the Internet, a fiber optic network, a coaxial cable network, an infrared (IR) network, a radio frequency (RF) network, and a combination thereof. Embodiments of the present invention are intended to include or otherwise cover any type of communication channel, including known, related art, and/or later developed technologies.

Figure 1B:
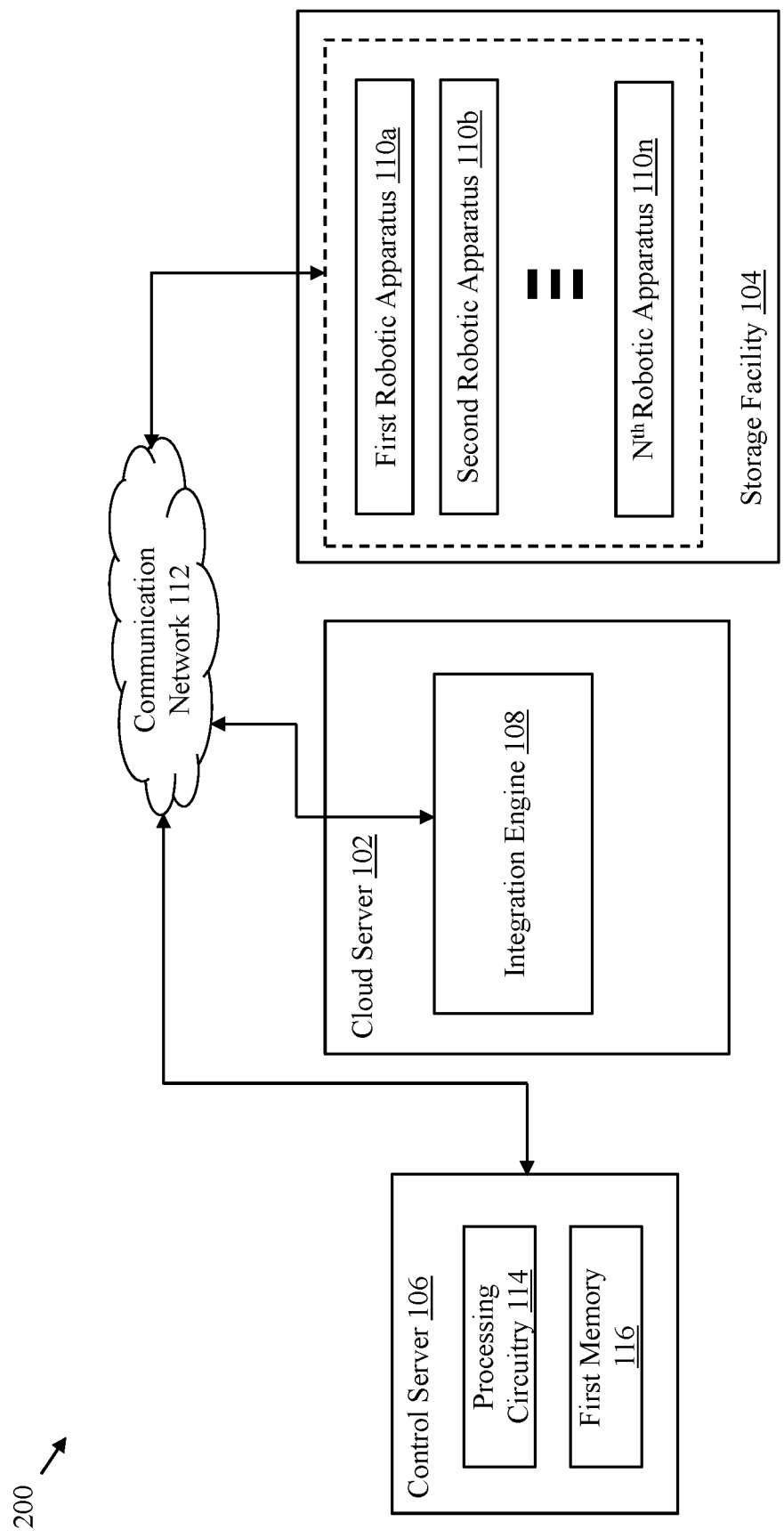
FIG. 1B is a block diagram that illustrates a system environment to facilitate communication between the control server and the plurality of robotic apparatuses, in accordance with another exemplary embodiment of the present disclosure.

FIG. 1B is a block diagram that illustrates a system environment 200 to facilitate communication between the control server 106 and the plurality of robotic apparatuses 110*a*-110*n*, in accordance with another exemplary embodiment of the present disclosure. The system environment 200 is shown to include the cloud server 102, the storage facility 104, the control server 106, and the communication network 112. The cloud server 102 may be configured to host the integration engine 108. The storage facility 104 includes the plurality of robotic apparatuses 110*a*-110*n*. The control server 106 is a standalone server. The control server 106 may communicate with the integration engine 108 by way of the communication network 112 or via separate communication networks established therebetween. Further, the plurality of robotic apparatuses 110*a*-110*n* may communicate with the integration engine 108 by way of the communication network 112 or via separate communication networks established therebetween. The integration engine 108 facilitates communication between the control server 106 and the plurality of robotic apparatuses 110*a*-110*n* as described in conjunction with FIG. 1A.

Figure 1C:
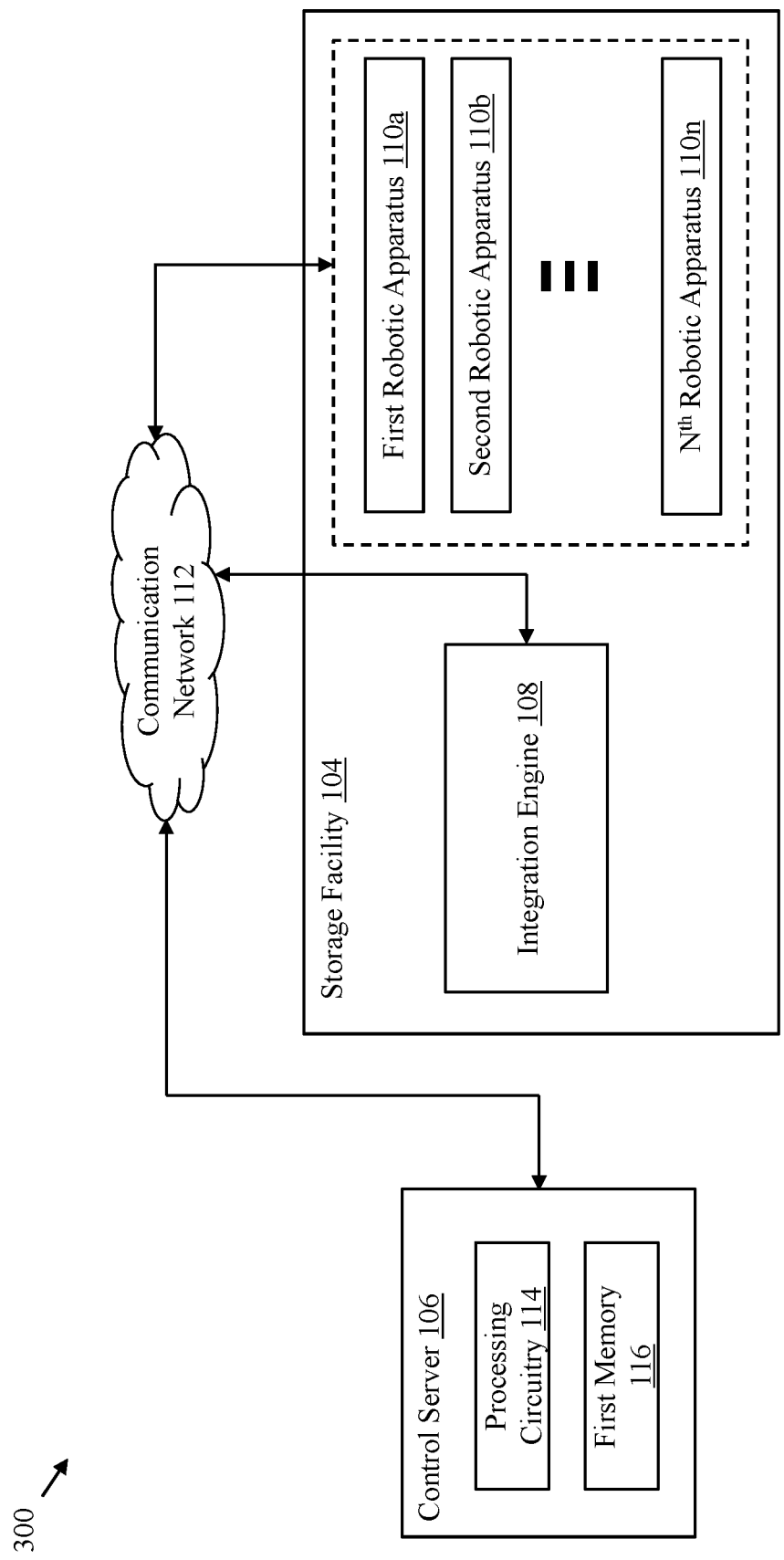
FIG. 1C is a block diagram that illustrates a system environment to facilitate communication between the control server and the plurality of robotic apparatuses, in accordance with yet another exemplary embodiment of the present disclosure.

FIG. 1C is a block diagram that illustrates a system environment 300 to facilitate communication between the control server 106 and the plurality of robotic apparatuses 110*a*-110*n*, in accordance with yet another exemplary embodiment of the present disclosure. The system environment 300 is shown to include the storage facility 104, the control server 106, and the communication network 112. The storage facility 104 may include the integration engine 108 and the plurality of robotic apparatuses 110*a*-110*n*. In some embodiments, the integration engine 108 may be a plug-in-play interface in the storage facility 104. The control server 106 may be a standalone server. The control server 106 may communicate with the integration engine 108 by way of the communication network 112 or via separate communication networks established therebetween. Further, the plurality of robotic apparatuses 110a-110n may communicate with the integration engine 108 by way of the communication network 112 or via separate communication networks established therebetween. The integration engine 108 facilitates communication between the control server 106 and the plurality of robotic apparatuses 110a-110n as described in conjunction with FIG. 1A.

Figure 1D:
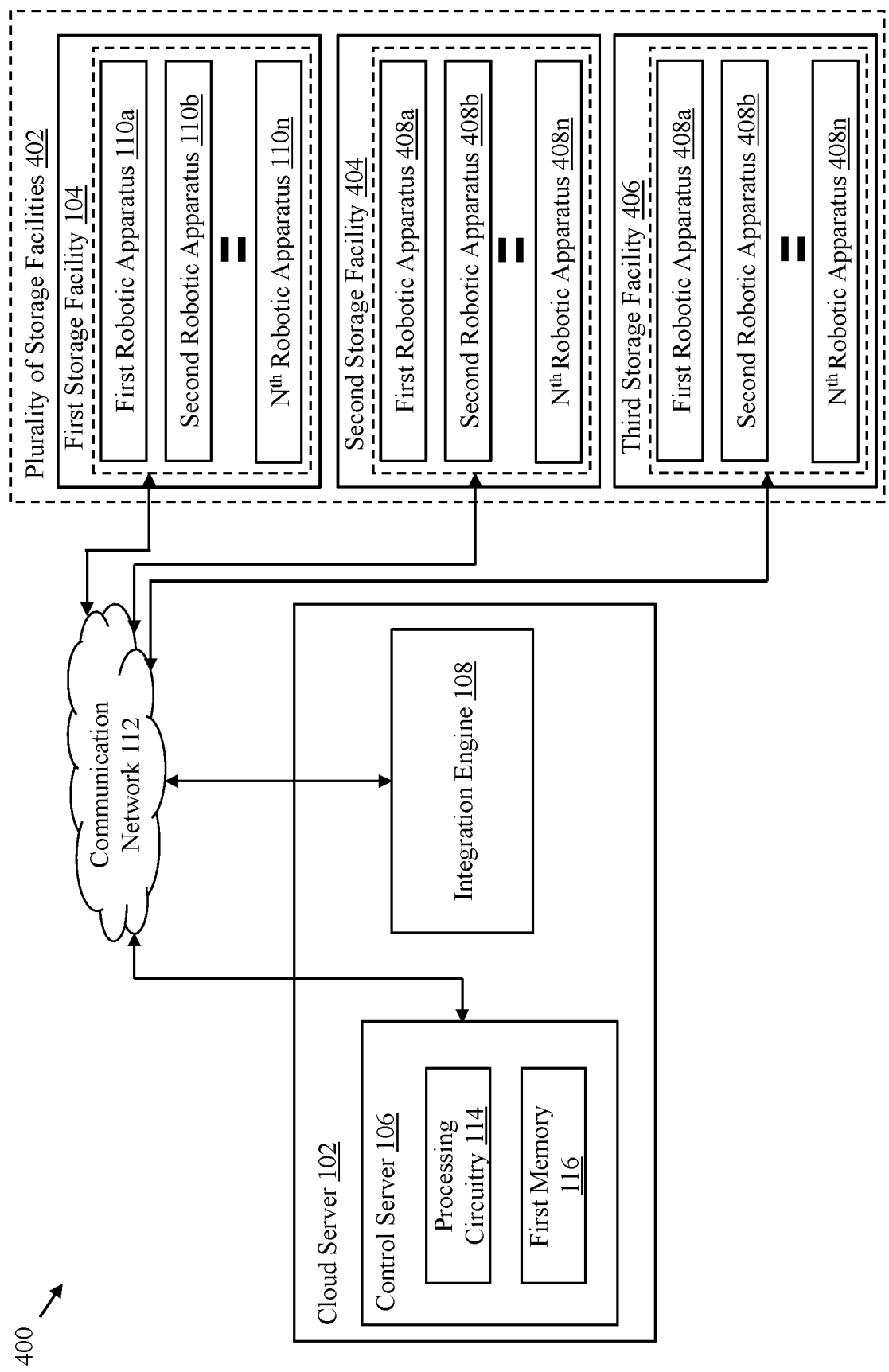
FIG. 1D is a block diagram that illustrates a system environment to facilitate communication between the control server and a plurality of storage facilities, in accordance with an exemplary embodiment of the present disclosure.

FIG. 1D is a block diagram that illustrates a system environment 400 to facilitate communication between the control server 106 and a plurality of storage facilities 402, in accordance with yet another exemplary embodiment of the present disclosure. The system environment 400 is shown to include the cloud server 102, the communication network 112, and the plurality of storage facilities 402. The cloud server 102 hosts the control server 106 and the integration engine 108 as described in FIG. 1A.

The plurality of storage facilities 402 may include the storage facility 104 (hereinafter referred to as "a first storage facility 104"), a second storage facility 404, and a third storage facility 406. For the sake of brevity, a number of storage facilities in the plurality of storage facilities 402 is considered as 3. However, it will be apparent to a person skilled in the art that the number of storage facilities in the plurality of storage facilities may not be limited to 3. Further, each storage facility of the plurality of storage facilities 402 may be located in different geographical locations or may belong to different vendors. The first storage facility 104 includes the plurality of robotic apparatuses 110a-110n (hereinafter referred to as "the first plurality of robotic apparatuses 110a-110n"), the second storage facility 404 may include a second plurality of robotic apparatuses 408a-408n, and the third storage facility 406 may include a third plurality of robotic apparatuses 410a-410n. The second plurality of robotic apparatuses 408a-408n include a first robotic apparatus 408a, a second robotic apparatus 408b, and so on till an $n^{th}$ robotic apparatus 408n. The third plurality of robotic apparatuses 410a-410n include a first robotic apparatus 410a, a second robotic apparatus 410b, and so on till an $n^{th}$ robotic apparatus 410n. The structure and functions of the second plurality of robotic apparatuses 408a-408n and the third plurality of robotic apparatuses 410a-410n may be the same or different than the plurality of robotic apparatuses 110a-110n.

The integration engine 108 facilitates communication between the control server 106 and the plurality of robotic apparatuses 110a-110n as described in conjunction with FIG. 1A. The integration engine 108 is further configured to facilitate communication between the control server 106 and the second plurality of robotic apparatuses 408a-408n in a similar manner as the facilitation of the communication between the control server 106 and the plurality of robotic apparatuses 110a-110n. The integration engine 108 is further configured to facilitate communication between the control server 106 and the third plurality of robotic apparatuses 410a-410n in a similar manner as the facilitation of the communication between the control server 106 and the plurality of robotic apparatuses 110a-110n.

Figure 2:
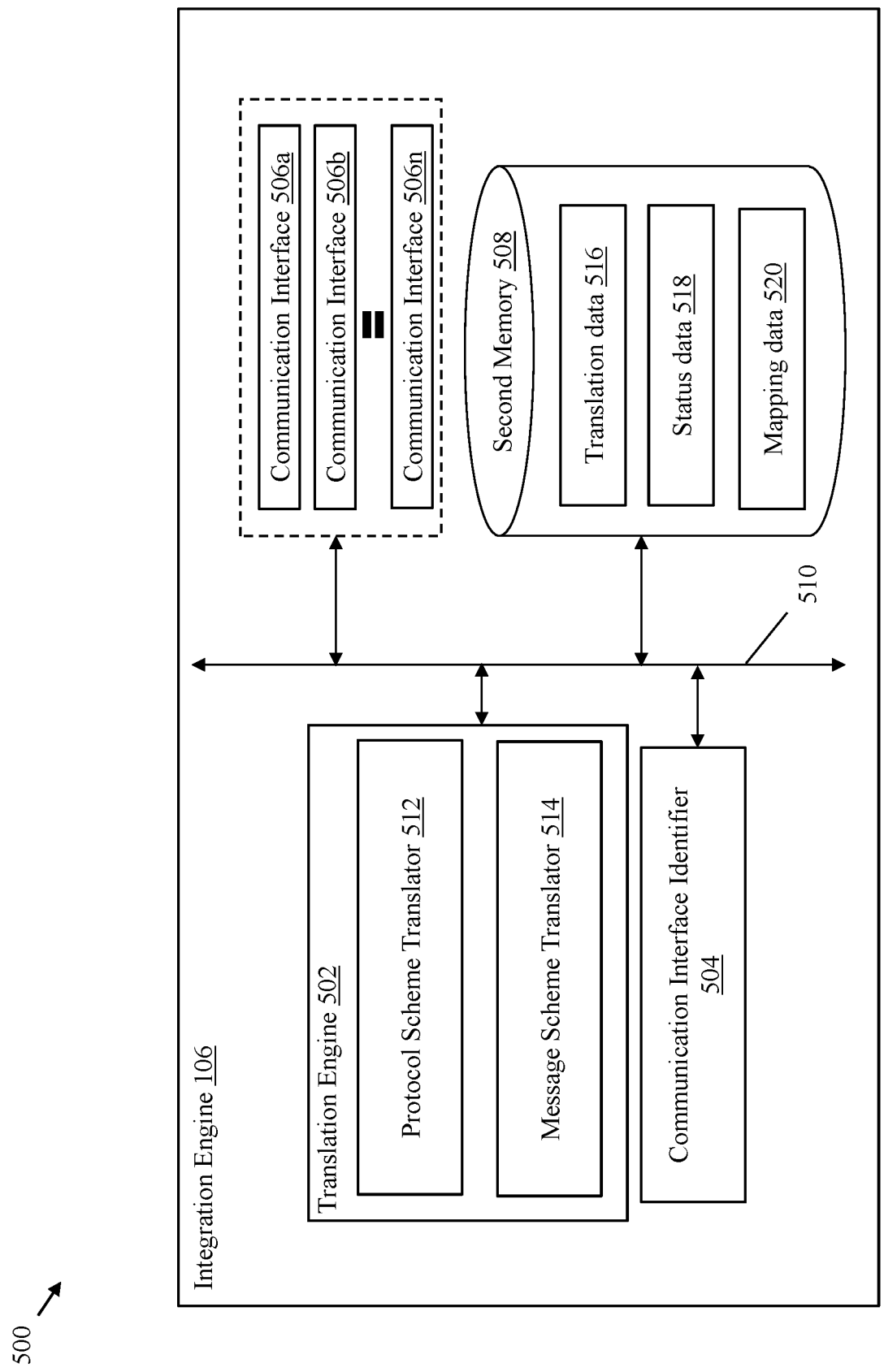
FIG. 2 is a block diagram that illustrates an integration engine, in accordance with an exemplary embodiment of the present disclosure.

FIG. 2 is a block diagram 500 that illustrates the integration engine 108, in accordance with an exemplary embodiment of the present disclosure. The integration engine 108 may include a translation engine 502, a communication interface identifier 504, a plurality of communication interfaces 506a-506n, and a second memory 508. The translation engine 502, the communication interface identifier 504, the plurality of communication interfaces 506a-506n, and the second memory 508 may communicate with each other by way of a first communication bus 510. The translation engine 502 includes a protocol scheme translator 512 and a message scheme translator 514.

In an embodiment, the integration engine 108 may be hardware circuitry, a software application, or a software solution that facilitates communication between the control server 106 and the plurality of robotic apparatuses 110a-110n. The integration engine 108 may correspond to software-as-a-service (SaaS).

In an embodiment, the control server 106 generates the first set of instructions that conforms to the first protocol scheme and has the first message scheme. Further, the first set of instructions is received by the translation engine 502 of the integration engine 108. The translation engine 502 is configured identify the protocol scheme and the message scheme of the first set of instructions, identify whether the protocol scheme and the message scheme of the first set of instructions are supported by the plurality of robotic apparatuses 110a-110n, transmit the first set of instructions to the plurality of robotic apparatuses 110a-110n when the protocol scheme and the message scheme of the first set of instructions are supported by the plurality of robotic apparatuses 110a-110n, translate the first set of instructions to the second set of instructions when the protocol scheme and the message scheme of the first set of instructions are not supported by the plurality of robotic apparatuses 110a-110n, and transmit the second set of instructions to the plurality of robotic apparatuses 110a-110n. The second set of instructions conforms to the second set of protocol schemes and have the second set of message schemes.

The protocol scheme translator 512 is configured to translate the first protocol scheme of the first set of instructions to the second set of protocol schemes by way of a first translation logic stored in the second memory 508. In a non-limiting example, the first protocol scheme is HTTP. The second protocol scheme of the second set of protocol schemes is TCP and the third protocol scheme of the second set of protocol schemes is FTP. The first robotic apparatus 110a supports only the second protocol scheme and the second robotic apparatus 110b supports only the third protocol scheme. The protocol scheme translator 512 translates the first protocol scheme of the first instruction of the first set of instructions to the second protocol scheme of the second set of protocol schemes. The protocol scheme translator 512 further translates the first protocol scheme of the second instruction of the first set of instructions to the third protocol scheme of the second set of protocol schemes. In a similar manner, the first protocol scheme of the first set of instructions is translated to the corresponding protocol scheme of the second set of protocol schemes.

The message scheme translator 514 is configured to translate the first message scheme of the first set of instructions to the second set of message schemes by way of a second translation logic stored in the second memory 508. In some embodiments, each instruction of the first set of instructions may include a first plurality of fields. The message scheme translator 514 translates the first plurality of fields of each instruction of the first set of instructions to a second plurality of fields. The second plurality of fields corresponds to the second set of message schemes. In a non-limiting example, the first message scheme is JSON. The second message scheme of the second set of message schemes is XML and the third message scheme of the second set of schemes is Python. The first robotic apparatus 110*a* supports only the second message scheme of the second set of message schemes. The second robotic apparatus 110*b* supports only the third message scheme of the second set of message schemes. The message scheme translator 514 translates the first message scheme of the first instruction of the first set of instructions to the second message scheme of the second set of message schemes. Similarly, the message scheme translator 514 translates the first message scheme of the second instruction of the first set of instructions to the third message scheme of the second set of message schemes. In a similar manner, the first message scheme of the first set of instructions is translated to the corresponding message scheme of the second set of message schemes.

Each communication interface of the plurality of communication interfaces 506*a*-506*n* may include any device or group of devices suitable for establishing a wired or wireless data connection to one or more data networks. Each communication interface of the plurality of communication interfaces 506*a*-506*n* is different from each other. Examples of a communication interface include, but are not limited to Ethernet network adapters, modems, Bluetooth modules, or the like. The plurality of communication interfaces 506*a*-506*n* facilitates at least one of the transmission and reception of the first set of instructions, the second set of instructions, the third set of instructions, and the fourth set of instructions by the integration engine 108.

The communication interface identifier 504 is configured to identify a communication interface of the plurality of communication interfaces 506*a*-506*n* through which a corresponding instruction of the second set of instructions is transmitted to a corresponding robotic apparatus of the plurality of robotic apparatuses 110*a*-110*n*. In a non-limiting example, the first robotic apparatus 110*a* is configured to receive instructions only through a modem. The control server 106 transmits the first instruction of the first set of instructions for the first robotic apparatus 110*a* via a Bluetooth module. In such a scenario, the communication interface identifier 504 identifies "Bluetooth module" as the communication interface to receive the first instruction and further identifies 'modem' as the communication interface to transmit the third instruction of the second set of instructions to the first robotic apparatus 110*a*.

The second memory 508 may be configured to store various logic, instructions, interfaces, and/or code executable by the integration engine 108 for facilitating communication between the control server 106 and the plurality of robotic apparatuses 110*a*-110*n*. The second memory 508 may be further configured to store therein, translation data 516, status data 518, and mapping data 520. The translation data 516 may include data associated with the translation of the first set of instructions to the second set of instructions. The status data 518 may indicate a connection status of each robotic apparatus of the plurality of robotic apparatuses 110*a*-110*n* to the integration engine 108. The connection status may be one of "connected," "not connected," and "disconnected". In a non-limiting example, the connection status of the first robotic apparatus 110*a* is "connected" and the connection status of the second robotic apparatus 110*b* is "not connected". Further, the mapping data 520 may include a table that indicates a mapping between the plurality of robotic apparatuses 110*a*-110*n* and the second set of protocol schemes. The table may further indicate a mapping between the plurality of robotic apparatuses 110*a*-110*n* and the second set of message schemes. In a non-limiting example, the first robotic apparatus 110*a* is mapped to the second protocol scheme (e.g., TCP) and the second message scheme (e.g., XML) and the second robotic apparatus 110*b* is mapped to the third protocol scheme (e.g., FTP) and the third message scheme (e.g., Python). The second memory 508 may be further configured to store a translation logic that facilitates the translation of the first set of instructions to the second set of instructions and the translation of the third set of instructions to the fourth set of instructions. Examples of the second memory 508 may include but are not limited to, a Read-Only Memory (ROM), a Random Access Memory (RAM), a flash memory, a removable storage drive, a hard disk drive (HDD), a solid-state memory, a magnetic storage drive, a Programmable Read Only Memory (PROM), an Erasable PROM (EPROM), and/or an Electrically EPROM (EEPROM).

In some embodiments, the integration engine 108 may be configured to select robotic apparatuses of the plurality of robotic apparatuses 110*a*-110*n* to execute corresponding services of the plurality of services in the storage facility 104. In some embodiments, another plurality of robotic apparatuses (not shown) that operate on protocol schemes and with message schemes other than the first protocol scheme, the second set of protocol scheme, the first message scheme, and the second set of message schemes may be onboarded to the storage facility 104. The integration engine 108 may facilitate the communication between the control server 106 and the other plurality of robotic apparatuses (not shown).

Figure 3:
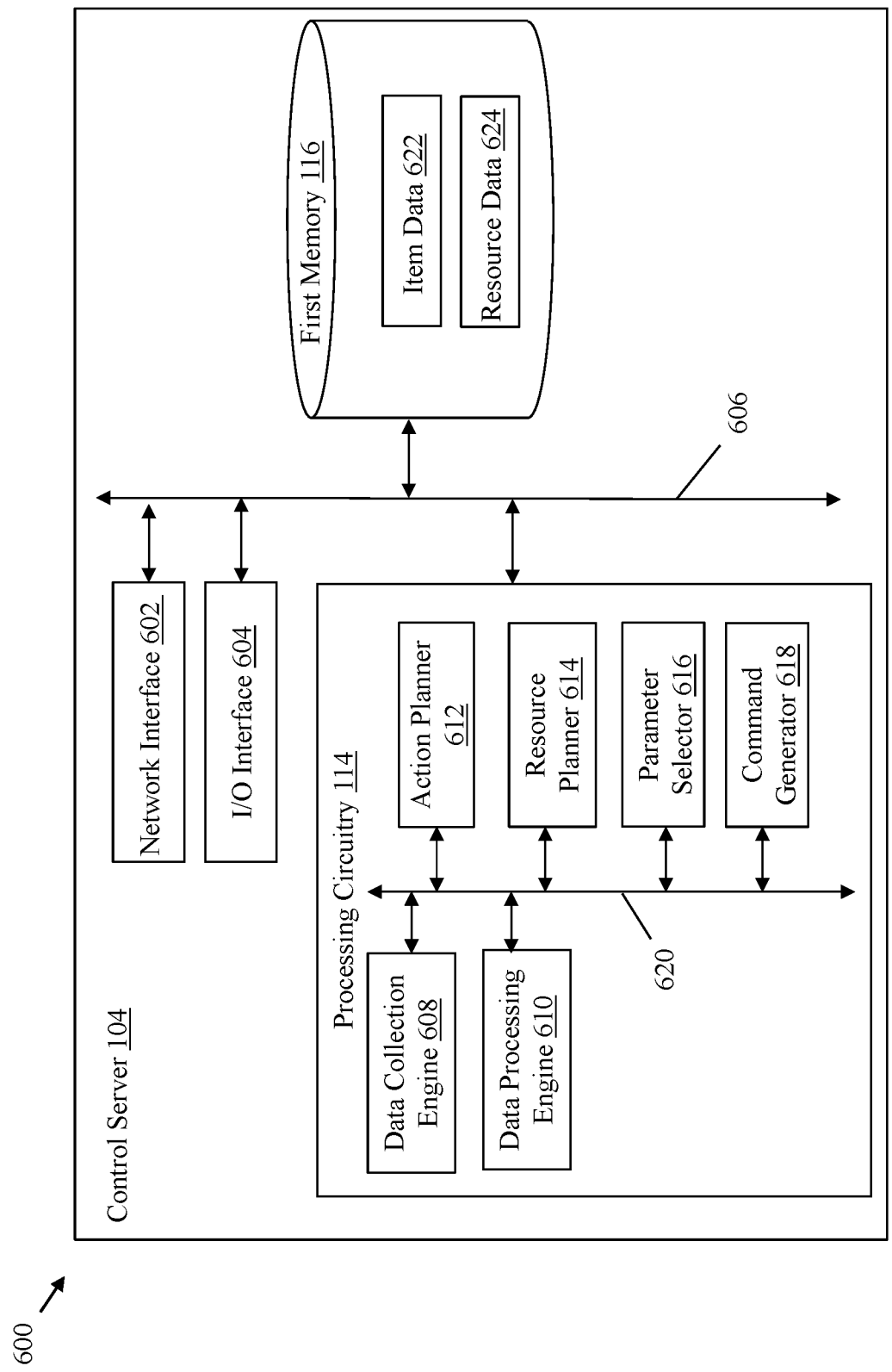
FIG. 3 is a block diagram that illustrates a control system, in accordance with an exemplary embodiment of the present disclosure.

FIG. 3 is a block diagram 600 that illustrates the control server 106, in accordance with an exemplary embodiment of the present disclosure. The control server 106 may include the processing circuitry 114 and the first memory 116. The control server 106 may further include a network interface 602 and an input/output (I/O) interface 604. The processing circuitry 114, the first memory 116, the network interface 602, and the input/output (I/O) interface 604 may communicate with each other by way of a second communication bus 606. The processing circuitry 114 may include a data collection engine 608, a data processing engine 610, an action planner 612, a resource planner 614, a parameter selector 616, and a command generator 618. It will be apparent to a person having ordinary skill in the art that the control server 106 is not limited to any specific combination of hardware circuitry and/or software.

The first memory 116 may be configured to store item data 622 of a plurality of items stored in the storage facility 104. The item data 622 may include identification data associated with the plurality of items. In some embodiments, the item data 622 may include Stock Keeping Units (SKUs). An SKU for an item may be a unique code that is physically readable or electronically readable by one or more image sensors in the storage facility 104. The item data 622 may further include storage locations of various items in the storage facility 104. In one example, the item data 622 may include a virtual map marked with locations of the inventory items in the storage facility 104.

The first memory 116 may be further configured to store resource data 624. The resource data 624 may include various configuration parameters associated with each of the robotic apparatus of the plurality of robotic apparatuses 110*a*-110*n* that may facilitate in selection and allocation of the robotic apparatuses of the plurality of robotic apparatuses 110*a*-110*n* upon detection of a service by the control server 106.

The control server 106 may be further configured to monitor in real-time, a condition (e.g., a battery status, or the like), availability, a current location, a turnaround time of the plurality of robotic apparatuses 110a-110n to update the resource data 624.

The network interface 602 may include suitable logic, circuitry, and interfaces that may be configured to establish and enable communication between the control server 106 and the communication network 112. The network interface 602 may be implemented by use of various known technologies to support wired or wireless communication of the control server 106 with the communication network 112. The network interface 602 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit.

The I/O interface 604 may include suitable logic, circuitry, interfaces, and/or code that may be configured to receive inputs (e.g., orders) and transmit server outputs via a plurality of data ports in the control server 106. The I/O interface 604 may include various input and output data ports for different I/O devices. Examples of such I/O devices may include, but are not limited to, a touch screen, a keyboard, a mouse, a joystick, a projector audio output, a microphone, an image-capture device, a liquid crystal display (LCD) screen, and/or a speaker.

The processing circuitry 114 may be configured to perform various inventory management operations by way of the data collection engine 608, the data processing engine 610, the action planner 612, the resource planner 614, the parameter selector 616, and the command generator 618.

The data collection engine 608 may be configured to receive service requests associated with items through the integration engine 108. The system and method of the disclosure may simultaneously process multiple service requests without deviating from the scope of the disclosure. Examples of the service requests may include replenishment requests, order fulfilment requests, order consolidation requests, item sortation requests, or the like.

The data collection engine 608 may be further configured to transmit the received service requests to the data processing engine 610 through the third communication bus 620. The data collection engine 608 may be further configured to store the received service requests in the first memory 116. The data processing engine 610 may be configured to receive the service requests from the data collection engine 608 and further process the received service requests.

For each service request, the action planner 612 may be configured to identify the plurality of services (or operations) that need to be performed by the plurality of robotic apparatuses 110a-110n to fulfill the corresponding service request. Examples of such services may include transportation of a payload from one location to another, order consolidation, pick/put actions, item sortation, or the like. The action planner 612 may be configured to transmit the identified plurality of services to the resource planner 614.

The resource planner 614 may be configured to select, from the plurality of robotic apparatuses 110a-110n, one or more robotic apparatuses that are capable of executing the identified plurality of services. The selection of the one or more robotic apparatuses is based on capabilities of the one or more robotic apparatuses, availability of the one or more robotic apparatuses, or the turnaround time associated with the one or more robotic apparatuses. In other words, the plurality of robotic apparatuses 110a-110n may be associated with various classes and sub-classes indicating service execution capabilities of the plurality of robotic apparatuses 110a-110n, and the resource planner 614 may select those robotic apparatuses that are capable of executing the identified plurality of services. The resource planner 614 may communicate information pertaining to the selected one or more robotic apparatuses to the parameter selector 616.

The parameter selector 616 may be configured to refer to the resource data 624 to determine the configuration parameters for the selected robotic apparatuses so as to control the selected robotic apparatuses for executing the identified services. The parameter selector 616 may be further configured to determine values of the configuration parameters to enable execution of the identified services by the selected robotic apparatuses. The values of the configuration parameters may be determined based on the operational ranges of the configuration parameters as indicated in the resource data 624. The parameter selector 616 may be configured to communicate, for each selected robotic apparatuses of the plurality of robotic apparatuses 110a-110n, the determined configuration parameters and the values of the configuration parameters to the command generator 618.

The command generator 618 may be configured to generate commands for each selected robotic apparatuses based on the determined configuration parameters of each selected robotic apparatuses. The command generator 618 may be further configured to communicate the generated commands to the respective selected robotic apparatuses through the integration engine 108 for the execution of the services via the network interface 602. The commands generated by the command generator 618 are also referred to as "the first set of instructions".

Figure 4A:
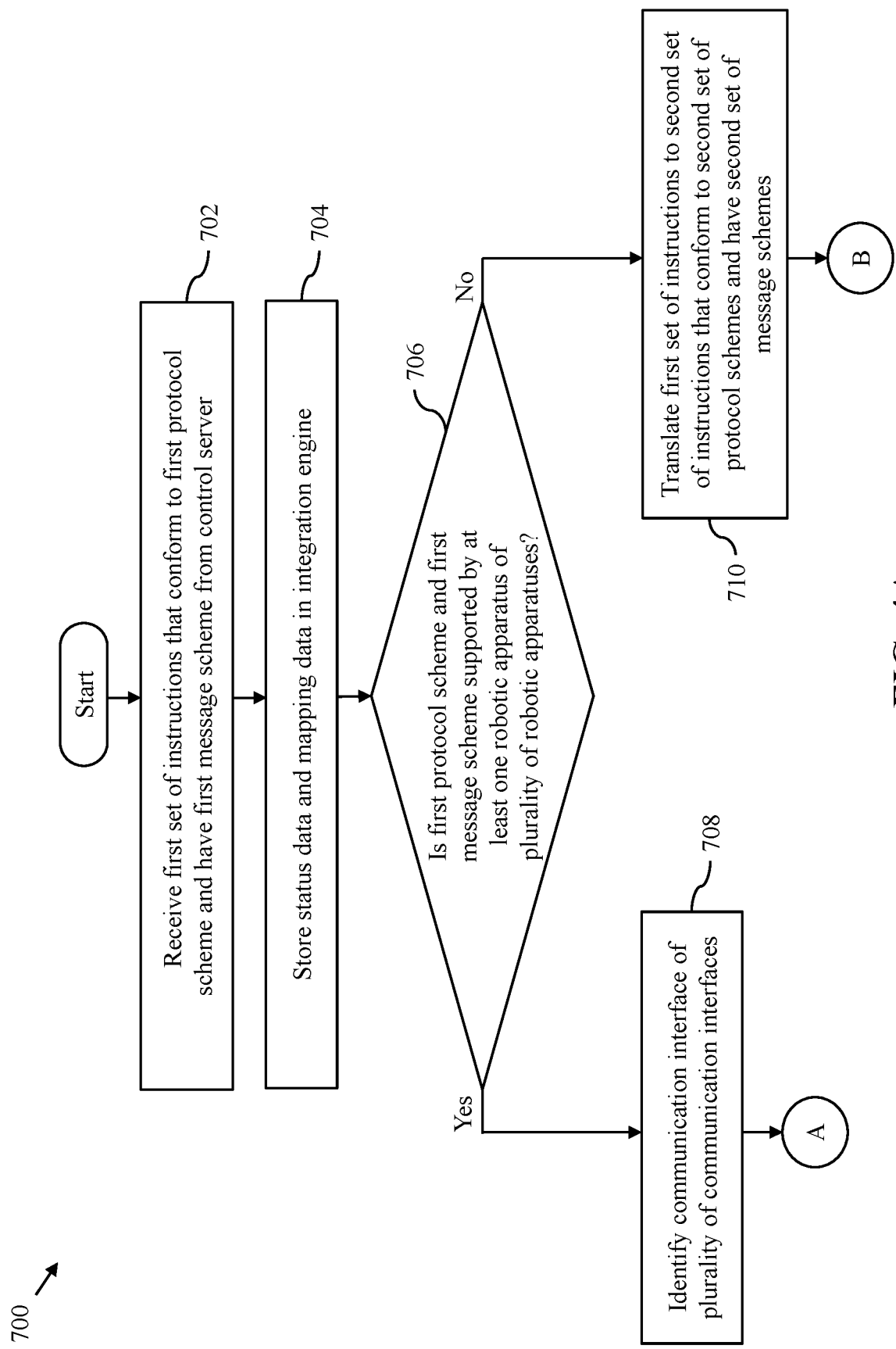
FIGS. 4A and 4B represent a flow chart that illustrates a method to facilitate communication between the control server and the plurality of robotic apparatuses, in accordance with an exemplary embodiment of the present disclosure.
Figure 4B:
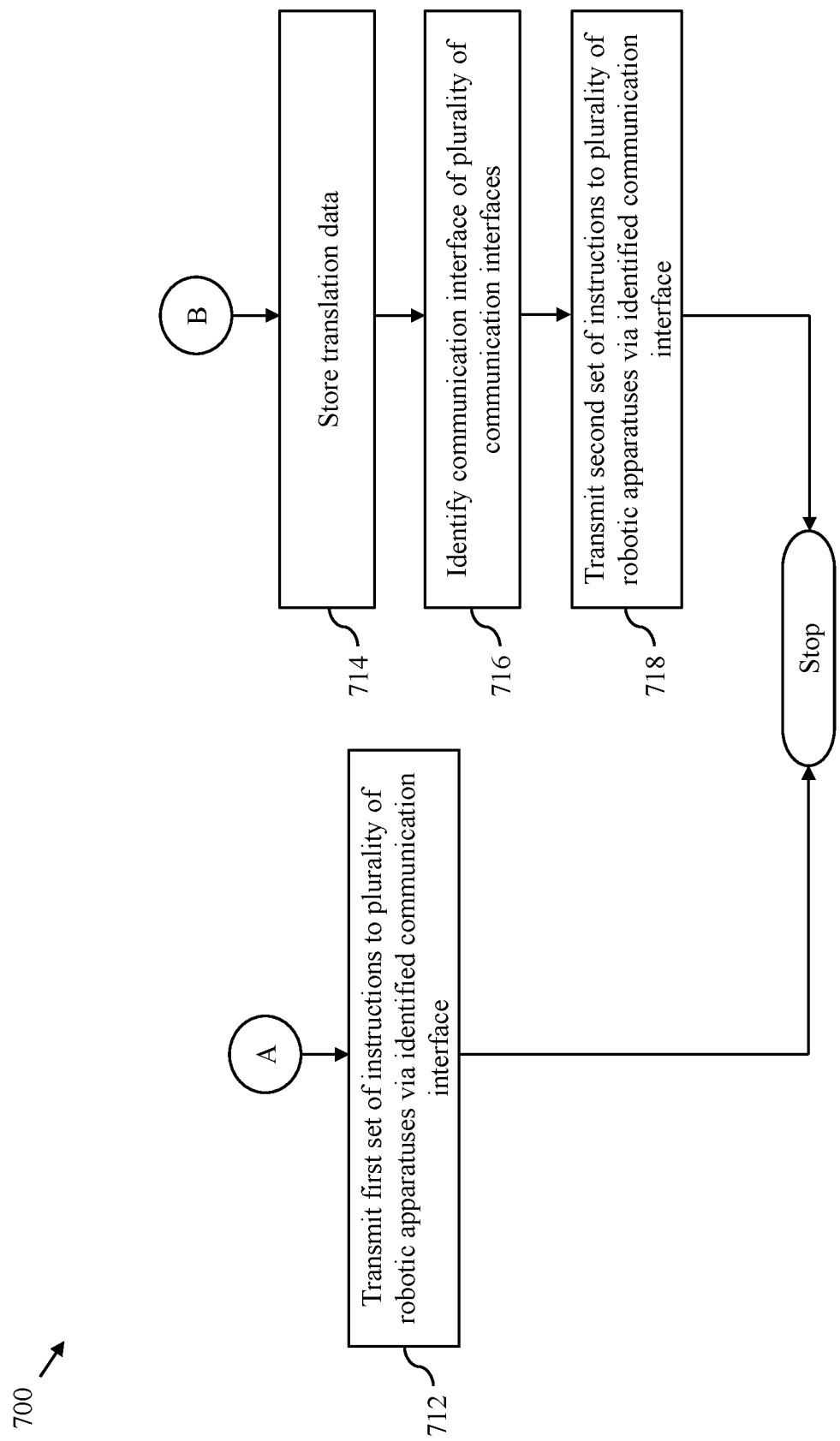

FIGS. 4A and 4B represent a flow chart 700 that illustrates a method (i.e., a process) to facilitate communication between the control server 106 and the plurality of robotic apparatuses 110a-110n, in accordance with an exemplary embodiment of the present disclosure.

Referring now to FIG. 4A, the process may generally start at step 702, the integration engine 108 may receive the first set of instructions from the control server 106. The first set of instructions conform to the first protocol scheme and have the first message scheme. At step 704, the integration engine 108 may store the status data 518 and the mapping data 520 in the integration engine 108. The status data 518 indicates the connection status of each robotic apparatus of the plurality of robotic apparatuses 110a-110n with the integration engine 108. The mapping data 520 indicates the mapping between the plurality of robotic apparatuses 110a-110n and the second set of protocol schemes and the mapping between the plurality of robotic apparatuses a110a-110n and the second set of message schemes. The status data 518 and the mapping data 520 are stored in the second memory 508 of the integration engine 108. At step 706, based on the mapping data 520, the integration engine 108 identifies if at least one robotic apparatus of the plurality of robotic apparatuses 110a-110n supports the first protocol scheme and the first message scheme. If at step 706, the integration engine 108 identifies that at least one robotic apparatus of the plurality of robotic apparatuses 110a-110n supports the first protocol scheme and the first message scheme, then the process proceeds to step 708. At step 708, the communication interface identifier 504 may identify the second set of communication interfaces of the plurality of communication interfaces 506a-506n that can facilitate the transmission of the first set of instructions to the plurality of robotic apparatuses 110a-110n. If at step 706, the integration engine 108 identifies that the plurality of robotic apparatuses 110a-110n does not support the first protocol scheme and the first message scheme, then the process proceeds to step 710. At step 710, the translation engine 502 may translate the first set of instructions to the second set of instructions. The second set of instructions conform to the second set of protocol schemes and have the second set of message schemes that are supported by the plurality of robotic apparatuses 110a-110n. The protocol scheme translator 512 translates the first protocol scheme to the second set of protocol schemes and the message scheme translator 514 translates the first message scheme to the second set of message schemes.

Referring now to FIG. 4B, at step 712, the integration engine 108 may transmit the first set of instructions to the plurality of robotic apparatuses 110a-110n via the second set of communication interfaces of the plurality of communication interfaces 506a-506n. The plurality of robotic apparatuses 110a-110n may execute services of the plurality of services in the storage facility 104 based on the received first set of instructions. At step 714, the integration engine may store the translation data 516 that indicates the translation of the first set of instructions to the second set of instructions. At step 716, the communication interface identifier 504 may identify the second set of communication interfaces of the plurality of communication interfaces 506a-506n that can facilitate the transmission of the second set of instructions to the plurality of robotic apparatuses 110a-110n. At step 718, the integration engine 108 may transmit the second set of instructions to the plurality of robotic apparatuses 110a-110n via the second set of communication interfaces of the plurality of communication interfaces 506a-506n. The plurality of robotic apparatuses 110a-110n may execute services of the plurality of services in the storage facility 104 based on the received second set of instructions.

Figure 5A:
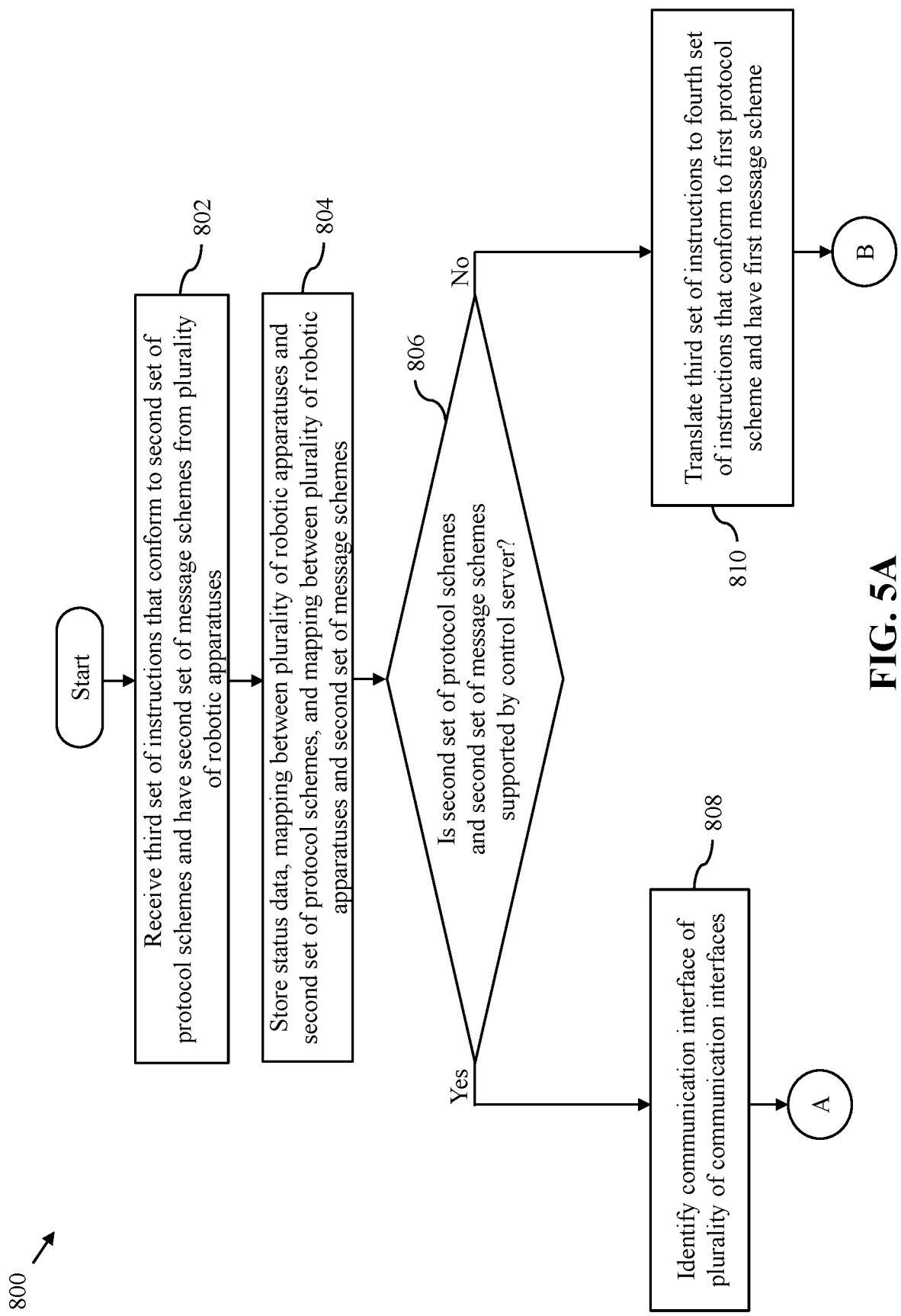
FIGS. 5A and 5B represent a flow chart that illustrates a method to facilitate communication between the control server and the plurality of robotic apparatuses, in accordance with another exemplary embodiment of the present disclosure.
Figure 5B:
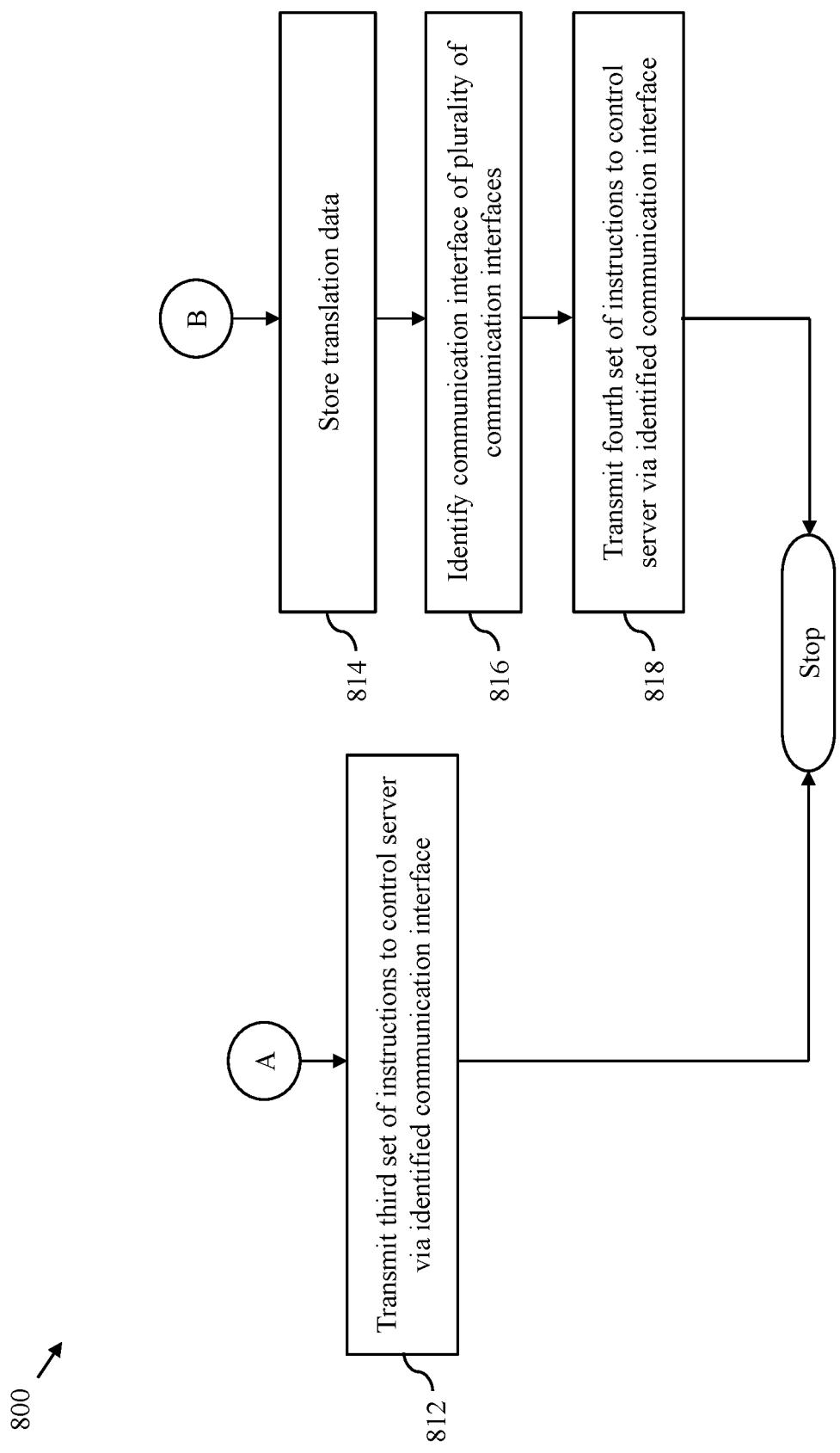

FIGS. 5A and 5B represent a flow chart 800 that illustrates a method (i.e., a process) to facilitate communication between the control server 106 and the plurality of robotic apparatuses 110a-110n, in accordance with another exemplary embodiment of the present disclosure.

Referring now to FIG. 5A, the process may generally start at step 802, the integration engine 108 may receive the third set of instructions from the plurality of robotic apparatuses 110a-110n. The third set of instructions conforms to the second set of protocol schemes and have the second set of message schemes. At step 804, the integration engine 108 may store the status data 518 and the mapping data 520. The status data 518 indicates the connection status of each robotic apparatus of the plurality of robotic apparatuses 110a-110n with the integration engine 108. The mapping data 520 indicates the mapping between the plurality of robotic apparatuses 110a-110n and the second set of protocol schemes and the mapping between the plurality of robotic apparatuses 110a-110n and the second set of message schemes. The status data 518 and the mapping data 520 are stored in the second memory 508 of the integration engine 108. At step 806, based on the mapping data 520, the integration engine 108 identifies if the control server 106 supports the second set of protocol schemes and the second set of message schemes. If at step 806, the integration engine 108 identifies that the control server 106 supports the second set of protocol schemes and the second set of message schemes, then the process proceeds to step 808. At step 808, the communication interface identifier 504 may identify the first communication interface of the plurality of communication interfaces 506a-506n that can facilitate the transmission of the third set of instructions to the control server 106. If at step 806, the integration engine 108 identifies that the control server 106 does not support the second set of protocol schemes and the second set of message schemes, then the process proceeds to step 810. At step 810, the translation engine 502 may translate the third set of instructions to the fourth set of instructions. The fourth set of instructions conform to the first protocol scheme and have the first message scheme that are supported by the control server 106. The protocol scheme translator 512 translates the second set of protocol schemes to the first protocol scheme and the message scheme translator 514 translates the second set of message schemes to the first message scheme.

Referring now to FIG. 5B, at step 812, the integration engine 108 may transmit the third set of instructions to the control server 106 via the first communication interface of the plurality of communication interfaces 506a-506n. The plurality of services for the plurality of robotic apparatuses 110a-110n may be executed based on the third set of instructions. At step 814, the integration engine 108 may store the translation data 516 that indicates the translation of the third set of instructions to the fourth set of instructions. At step 816, the communication interface identifier 504 may identify the first communication interface of the plurality of communication interfaces 506a-506n that can facilitate the transmission of the fourth set of instructions to the control server 106. At step 818, the integration engine 108 may transmit the fourth set of instructions to the control server 106 via the identified communication interface of the plurality of communication interfaces 506a-506n. The plurality of services for the plurality of robotic apparatuses 110a-110n may be executed based on the fourth set of instructions.

Figure 6:
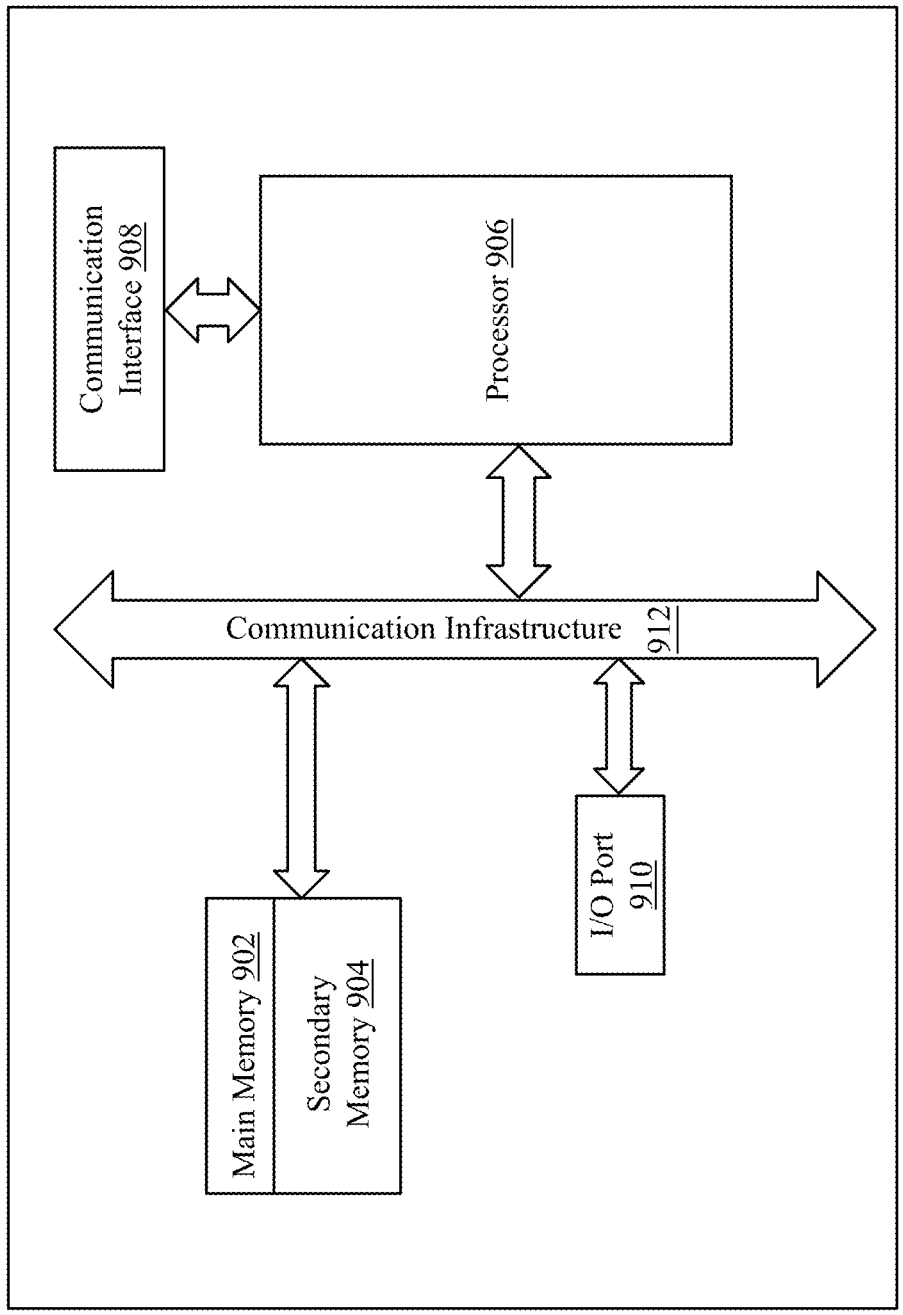
FIG. 6 is a block diagram that illustrates a system architecture of a computer system to facilitate communication between the control server and the plurality of robotic apparatuses, in accordance with an exemplary embodiment of the present disclosure.

FIG. 6 is a block diagram that illustrates a system architecture of a computer system 900 to facilitate communication between the control server 106 and the plurality of robotic apparatuses 110a-110n, in accordance with an exemplary embodiment of the present disclosure. An embodiment of the disclosure, or portions thereof, may be implemented as computer-readable code on the computer system 900. In one example, the control server 106 and/or the integration engine 108 of FIG. 1A may be implemented in the computer system 900 using hardware, software, firmware, non-transitory computer-readable media having instructions stored thereon, or a combination thereof and may be implemented in one or more computer systems or other processing systems. Hardware, software, or any combination thereof may embody modules and components used to implement the methods of FIGS. 4A-4B and 5A-5B. The computer system 900 may include a main memory 902, a secondary memory 904, a processor 906, a communication interface 908, an input/output (I/O) port 910, and a communication infrastructure 912.

Examples of the main memory 902 may include a random access memory (RAM), a read-only memory (ROM), and the like. The secondary memory 904 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage drive may be a non-transitory computer-readable recording media.

The processor 906 may be a special purpose or a general-purpose processing device. The processor 906 may be a single processor or multiple processors. The processor 906 may have one or more processor "cores." Further, the processor 906 may be coupled to the communication interface 908 such as a bus, a bridge, a message queue, the communication network 112, multi-core message-passing scheme, or the like.

The I/O port 910 may include various input and output devices that are configured to communicate with the processor 906. Examples of the input devices may include a keyboard, a mouse, a joystick, a touchscreen, a microphone, and the like. Examples of the output devices may include a display screen, a speaker, headphones, and the like. The communication infrastructure 912 may be configured to allow data to be transferred between the computer system 900 and various devices that are communicatively coupled to the computer system 900. Examples of the communication infrastructure 912 may include a modem, a network interface, i.e., an Ethernet card, a communication port, and the like. Data transferred via the communication infrastructure 912 may be signals, such as electronic, electromagnetic, optical, or other signals as will be apparent to a person skilled in the art. The signals may travel via a communications channel, such as the communication network 112, which may be configured to transmit the signals to the various devices that are communicatively coupled to the computer system 900. Examples of the communication channel may include a wired, wireless, and/or optical medium such as cable, fiber optics, a phone line, a cellular phone link, a radio frequency link, and the like. The main memory 902 and the secondary memory 904 may refer to non-transitory computer-readable mediums that may provide data that enables the computer system 900 to implement the methods illustrated in FIGS. 4A-4B and 5A-5B.

The disclosed embodiments encompass numerous advantages. Exemplary advantages of the disclosed methods include, but are not limited to a system and method to facilitate communication between the control server 106 and the plurality of robotic apparatuses 110a-110n. The disclosed methods and system offer a solution where the control server 106 and the plurality of robotic apparatuses 110a-110n support different protocol schemes and different message schemes. The integration engine 108 facilitates communication between the control server 106 and the plurality of robotic apparatuses 110a-110n, thereby improving the scalability of storage facilities and enabling the storage facilities to onboard robotic devices from different vendors that may support various protocol and message schemes.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features a method and system for facilitating communication between the control server 106 and the plurality of robotic apparatuses 110a-110n. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the width or scope.

The invention claimed is:

1. A method that facilitates communication between a control server and a plurality of robotic apparatuses, the method comprising:
   receiving, by an integration engine, from the control server, a first set of instructions that conform to a first protocol scheme and have a first message scheme;
   identifying, by the integration engine, whether the first protocol scheme and the first message scheme of the first set of instructions are supported by at least one robotic apparatus of the plurality of robotic apparatuses;
   transmitting, by the integration engine, the first set of instructions to the plurality of robotic apparatuses based on the identification that the first protocol scheme and the first message scheme of the first set of instructions are supported by at least one robotic apparatus of the plurality of robotic apparatuses;
   translating, by the integration engine, the first set of instructions to a second set of instructions based on the identification that a second set of protocol schemes and a second set of message schemes that are supported by the plurality of robotic apparatuses are different from the first protocol scheme and the first message scheme, respectively, (i) wherein the second set of instructions conform to the second set of protocol schemes and have the second set of message schemes, and (ii) wherein at least one of a first robotic apparatus and a second robotic apparatus of the plurality of robotic apparatuses executes a first service and a second service of a plurality of services in a storage facility based on a first instruction and a second instruction of the second set of instructions, respectively; and
   transmitting, by the integration engine, the second set of instructions to the plurality of robotic apparatuses, wherein at least one of the first instruction and the second instruction of the second set of instructions is transmitted to the first robotic apparatus and the second robotic apparatus of the plurality of robotic apparatuses, respectively.

2. The method of claim 1, further comprising:
   identifying, by the integration engine, a communication interface of a plurality of communication interfaces, wherein the plurality of communication interfaces facilitate the transmission of the second set of instructions to the plurality of robotic apparatuses, and wherein at least one of the first instruction and the second instruction of the second set of instructions is transmitted to the first robotic apparatus and the second robotic apparatus of the plurality of robotic apparatuses, via the identified communication interface.

3. The method of claim 1, further comprising:
   storing, in a memory of the integration engine, translation data associated with the translation of the first set of instructions to the second set of instructions and status data of the plurality of robotic apparatuses, wherein the status data indicates a connection status of each robotic apparatus of the plurality of robotic apparatuses with the integration engine.

4. The method of claim 1, further comprising:
   storing, in a memory of the integration engine, mapping data, wherein the mapping data indicates a mapping between (i) the plurality of robotic apparatuses and the second set of protocol schemes, and (ii) the plurality of robotic apparatuses and the second set of message schemes.

5. The method of claim 1, wherein each instruction of the first set of instructions includes a first plurality of fields, and the translation of the first message scheme of the first set of instructions to the second set of message schemes of the second set of instructions indicates that each field of the first plurality of fields is translated to generate a corresponding field of a second plurality of fields associated with the second set of instructions.

6. The method of claim 1, wherein the first set of instructions is translated to the second set of instructions by way of a translation logic.

7. A method that facilitates communication between a control server and a plurality of robotic apparatuses, the method comprising:
receiving, by an integration engine, from the plurality of robotic apparatuses, a first set of instructions that conform to a first set of protocol schemes and have a first set of message schemes;
identifying, by the integration engine, whether the first set of protocol schemes and the first set of message schemes of the first set of instructions are supported by the control server;
transmitting, by the integration engine, the first set of instructions to the control server based on the identification that the first set of protocol schemes and the first set of message schemes of the first set of instructions are supported by the control server;
translating, by the integration engine, the first set of instructions to a second set of instructions based on the identification that a second protocol scheme and a second message scheme that are supported by the control server are different from the first set of protocol schemes and the first set of message schemes, respectively, wherein the second set of instructions conform to the second protocol scheme and have the second message scheme; and
transmitting, by the integration engine, the second set of instructions to the control server, wherein a plurality of services for the plurality of robotic apparatuses are executed by the control server, based on the second set of instructions.

8. The method of claim 7, further comprising:
identifying, by the integration engine, a communication interface of a plurality of communication interfaces, wherein the plurality of communication interfaces facilitate reception of the first set of instructions by the integration engine, and wherein a corresponding instruction of the first set of instructions is received by the integration engine via the identified communication interface.

9. The method of claim 7, further comprising:
identifying, by the integration engine, a communication interface of a plurality of communication interfaces, wherein the second set of instructions is transmitted to the control server via the identified communication interface.

10. The method of claim 7, further comprising:
storing, in a memory of the integration engine, translation data associated with the translation of the first set of instructions to the second set of instructions and status data of the plurality of robotic apparatuses, wherein the status data indicates a connection status of each robotic apparatus of the plurality of robotic apparatuses with the integration engine.

11. The method of claim 7, further comprising:
storing, in a memory of the integration engine, mapping data, wherein the mapping data indicates a mapping between (i) the plurality of robotic apparatuses and the first set of protocol schemes, and (ii) the plurality of robotic apparatuses and the first set of message schemes.

12. The method of claim 7, wherein each instruction of the first set of instructions includes a first plurality of fields, and the translation of the first set of message schemes of the first set of instructions to the second message scheme of the second set of instructions indicates that each field of the first plurality of fields is translated to generate a corresponding field of a second plurality of fields associated with the second set of instructions.

13. The method of claim 7, wherein the first set of instructions is translated to the second set of instructions by way of a translation logic.

14. An integration engine that facilitates communication between a control server and a plurality of robotic apparatuses, the integration engine comprising:
a translation engine that is configured to:
receive from the plurality of robotic apparatuses, a first set of instructions that conform to a first set of protocol schemes and have a first set of message schemes;
identify whether the first set of protocol schemes and the first set of message schemes of the first set of instructions are supported by the control server;
transmit the first set of instructions to the control server based on the identification that the first set of protocol schemes and the first set of message schemes of the first set of instructions are supported by the control server;
translate the first set of instructions to a second set of instructions based on the identification that a second protocol scheme and a second message scheme that are supported by the control server are different from the first set of protocol schemes and the first set of message schemes, respectively, wherein the second set of instructions conform to the second protocol scheme and have the second message scheme;
transmit the second set of instructions to the control server;
receive from the control server, a third set of instructions that conform to the second protocol scheme and have the second message scheme, in response to the second set of instructions;
identify whether the second protocol scheme and the second message scheme of the third set of instructions are supported by at least one robotic apparatus of the plurality of robotic apparatuses;
transmit the third set of instructions to the plurality of robotic apparatuses based on the identification that the second protocol scheme and the second message scheme of the third set of instructions are supported by at least one robotic apparatus of the plurality of robotic apparatuses;
translate the third set of instructions to a fourth set of instructions based on the identification that the first set of protocol schemes and the first set of message schemes that are supported by the plurality of robotic apparatuses are different from the second protocol scheme and the second message scheme, respectively, (i) wherein the fourth set of instructions conform to the first set of protocol schemes and have the first set of message schemes, and (ii) wherein at least one of a first robotic apparatus and a second robotic apparatus of the plurality of robotic apparatuses executes a first service and a second service of a plurality of services in a storage facility based on a first instruction and a second instruction of the fourth set of instructions, respectively; and transmit the fourth set of instructions to the plurality of robotic apparatuses, wherein at least one of the first instruction and the second instruction of the fourth set of instructions is transmitted to the first robotic apparatus and the second robotic apparatus of the plurality of robotic apparatuses, respectively.

15. The integration engine of claim 14, further comprising a communication interface identifier that is configured identify a communication interface of a plurality of communication interfaces, wherein the plurality of communication interfaces facilitates the reception of the first set of instructions by the translation engine, and wherein a corresponding instruction of the first set of instructions is received by the translation engine via the identified communication interface.

16. The integration engine of claim 14, further comprising a communication interface identifier that is configured to identify a communication interface of a plurality of communication interfaces, wherein the plurality of communication interfaces facilitates the transmission of the fourth set of instructions to the plurality of robotic apparatuses, and wherein at least one of the first instruction and the second instruction of the fourth set of instructions is transmitted to the first robotic apparatus and the second robotic apparatus of the plurality of robotic apparatuses, via the identified communication interface.

17. The integration engine of claim 14, further comprising a memory that is configured to store translation data associated with the translation of the first set of instructions to the second set of instructions and the translation of the third set of instructions to the fourth set of instructions, and status data of the plurality of robotic apparatuses, wherein the status data indicates a connection status of each robotic apparatus of the plurality of robotic apparatuses with the integration engine.

18. The integration engine of claim 14, further comprising a memory that is configured to store mapping data, wherein the mapping data indicates a mapping between (i) the plurality of robotic apparatuses and the first set of protocol schemes, and (ii) the plurality of robotic apparatuses and the first set of message schemes.

19. The integration engine of claim 14, further comprising a memory that is configured to store a translation logic that translates (i) the first set of instructions to the second set of instructions and (ii) the third set of instructions to the fourth set of instructions.

20. The integration engine of claim 14, wherein the communication between the control server and the plurality of robotic apparatuses is facilitated by the integration engine that acts as a plug-in-play interface at the storage facility.

* * * * *